(12) United States Patent
Doubek et al.

(10) Patent No.: US 11,808,431 B2
(45) Date of Patent: Nov. 7, 2023

(54) LIGHTING DEVICES FOR CEILING GRIDS

(71) Applicant: Dado Lighting, LLC, Indian Head Park, IL (US)

(72) Inventors: David E. Doubek, Indian Head Park, IL (US); Erik Salinas, Indian Head Park, IL (US)

(73) Assignee: Dado Lighting, LLC, Indian Head Park, IL (US)

( * ) Notice: Subject to any disclaimer, the term of this patent is extended or adjusted under 35 U.S.C. 154(b) by 0 days.

(21) Appl. No.: 18/164,292

(22) Filed: Feb. 3, 2023

(65) Prior Publication Data

US 2023/0250929 A1 Aug. 10, 2023

Related U.S. Application Data

(60) Provisional application No. 63/308,854, filed on Feb. 10, 2022.

(51) Int. Cl.
| | | |
|---|---|---|
| *F21S 8/02* | (2006.01) | |
| *F21V 17/18* | (2006.01) | |
| *F21V 21/03* | (2006.01) | |
| *F21V 8/00* | (2006.01) | |

(52) U.S. Cl.
CPC ............. *F21S 8/026* (2013.01); *F21V 17/18* (2013.01); *F21V 21/03* (2013.01); *G02B 6/0088* (2013.01)

(58) Field of Classification Search
CPC .......... F21S 8/026; F21V 17/18; F21V 21/03; G02B 6/0088
See application file for complete search history.

(56) References Cited

U.S. PATENT DOCUMENTS

| 10,697,616 B2 * | 6/2020 | Vang ...................... F21V 21/005 |
| 11,181,262 B2 * | 11/2021 | Yaphe .................. G02B 6/0088 |
| 2023/0220961 A1 * | 7/2023 | Lu ........................... F21S 8/066 |
| | | 362/220 |

* cited by examiner

*Primary Examiner* — Anne M Hines
*Assistant Examiner* — Jose M Diaz
(74) *Attorney, Agent, or Firm* — Nixon Peabody LLP

(57) ABSTRACT

A lighting device includes a housing, a light source, a light guide panel, a lens, and a rotatable clip. The housing includes an internal cavity. The light guide panel is configured to diffuse light emitted by the one or more light sources. The lens includes a base, a first side wall, and a second side wall defining an internal cavity. The lens is coupled to the housing such that at least a portion of the housing is disposed within the internal cavity of the lens and at least a portion of the light diffused by the light guide panel is emitted through the base, the first side wall, and the second side wall of the lens. The rotatable clip is coupled to the housing and is configured to mount the lighting device to an external structure.

20 Claims, 12 Drawing Sheets

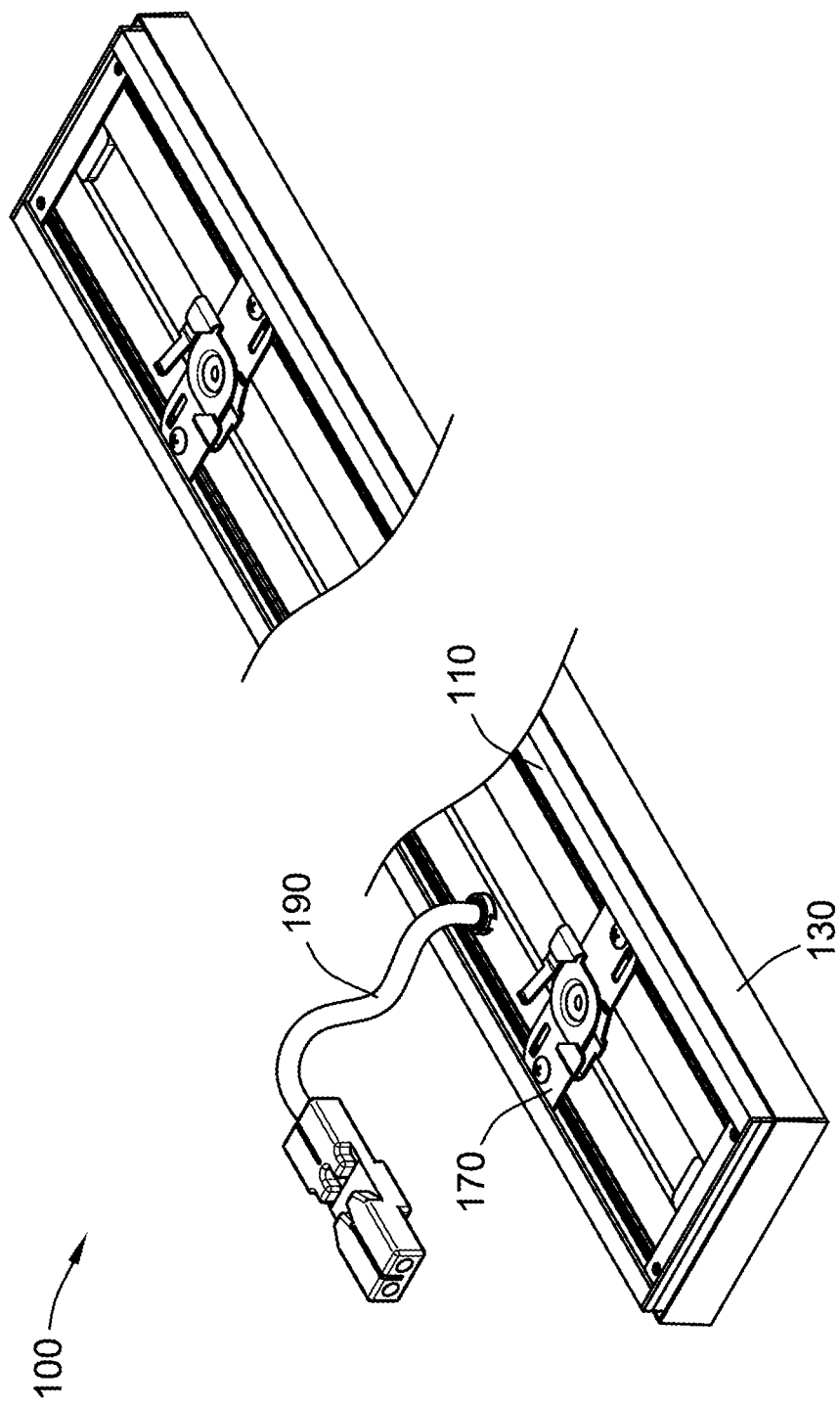

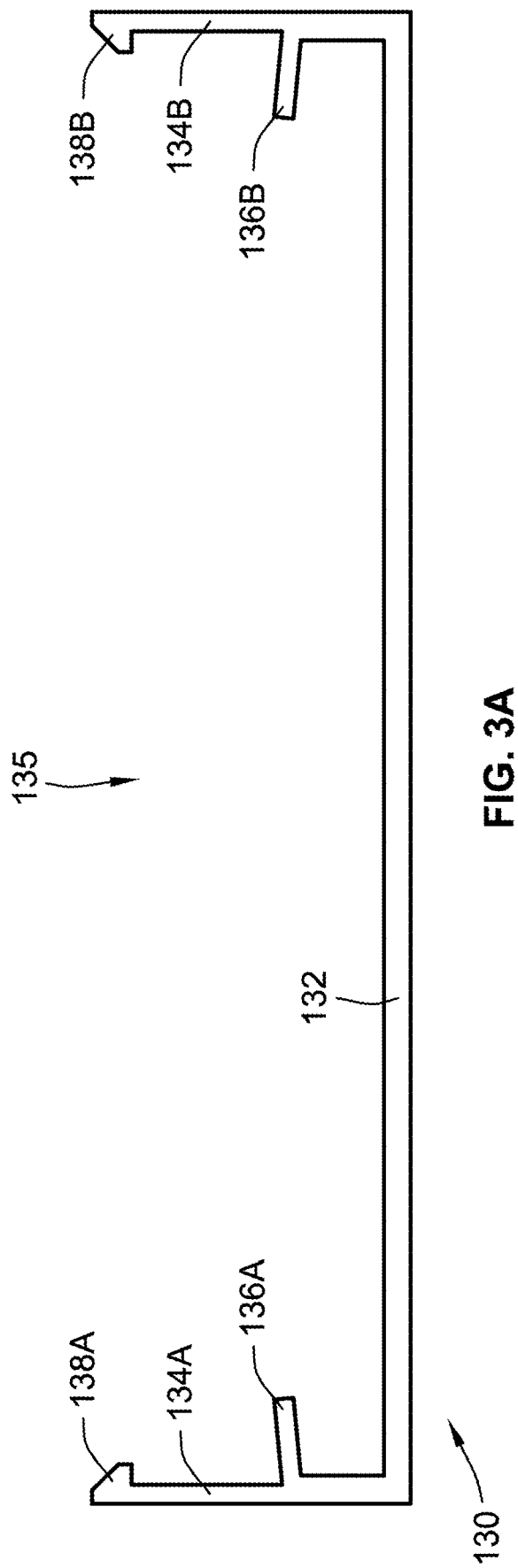
FIG. 3A
FIG. 3B
FIG. 3C

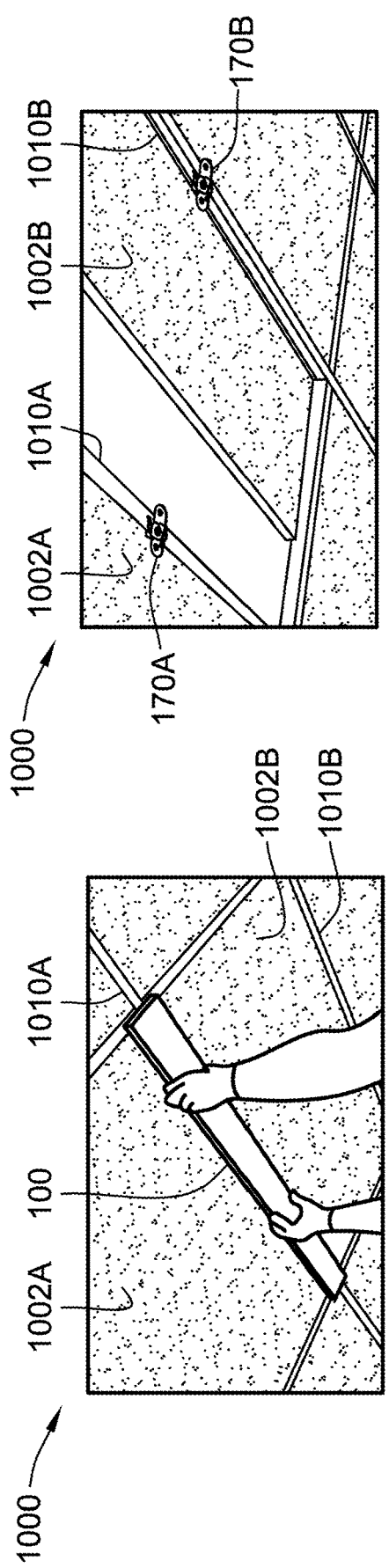
FIG. 10A
FIG. 10B
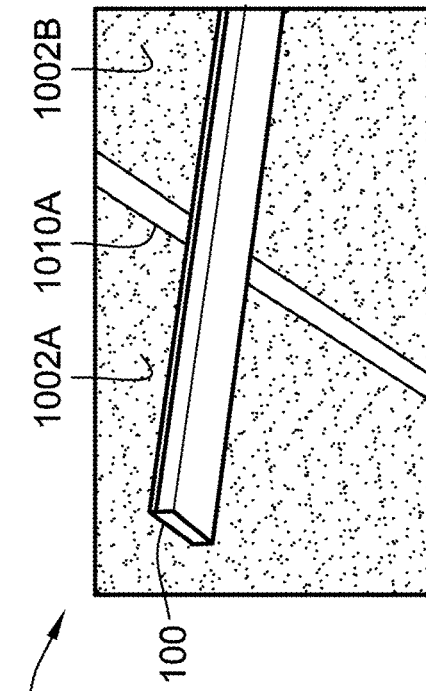
FIG. 10D
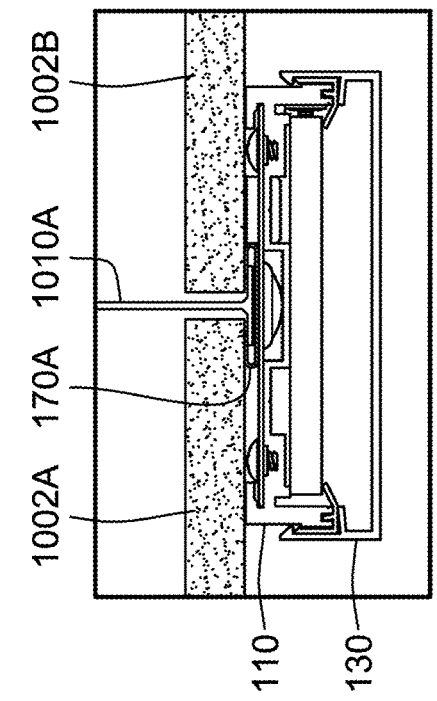
FIG. 10C

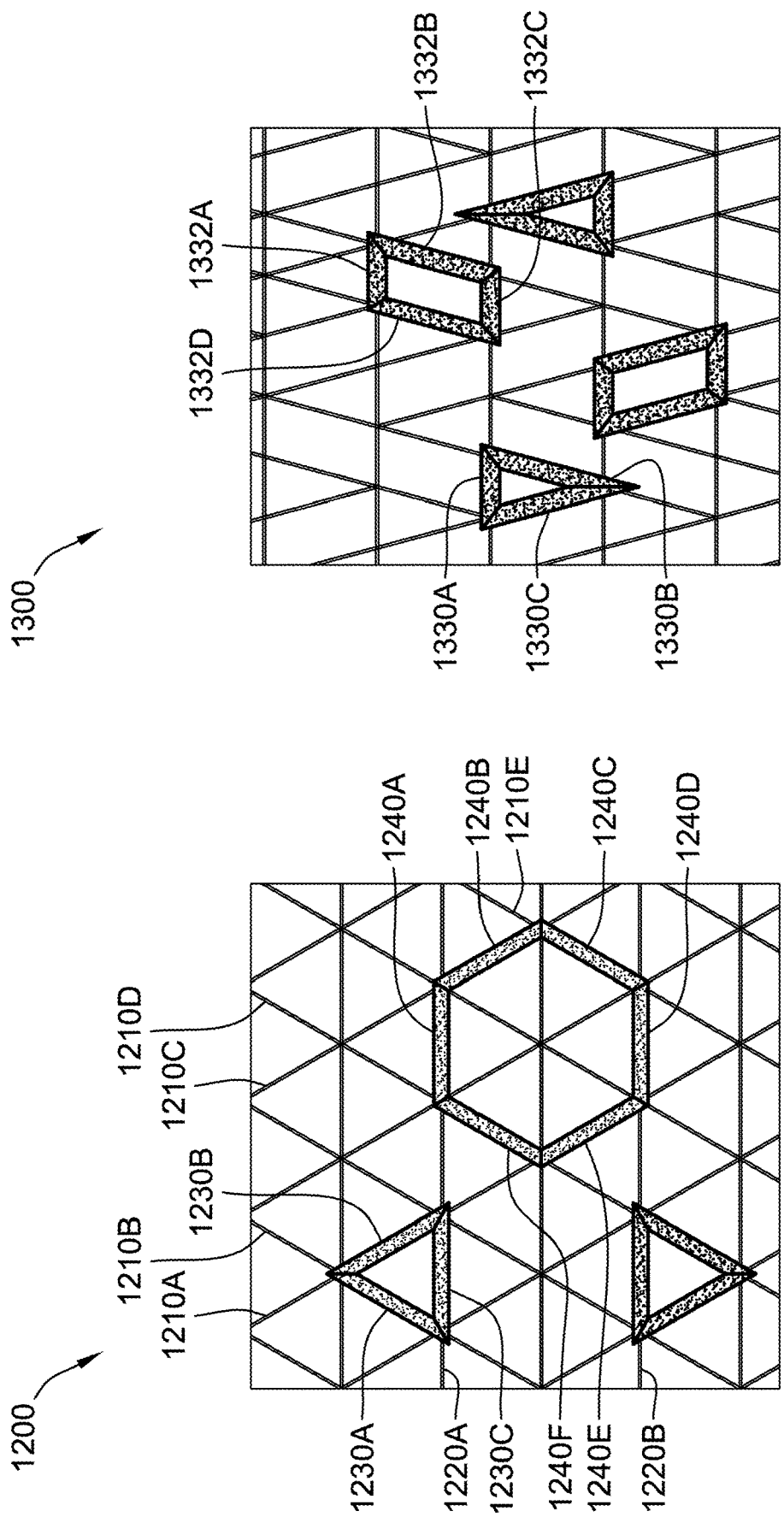

LIGHTING DEVICES FOR CEILING GRIDS

CROSS REFERENCE TO RELATED APPLICATIONS

This application claims the benefit of, and priority to, U.S. Provisional Application No. 63/308,854, filed Feb. 10, 2022, which is hereby incorporated by reference herein in its entirety.

TECHNICAL FIELD

The present disclosure relates generally to lighting devices, and more particularly, to lighting devices including a rotatable clip for mounting the lighting device to an external structure (e.g., a ceiling tile grid) and methods for using the same.

BACKGROUND

Many indoor spaces (e.g., residential or commercial) have so-called drop ceilings, which often include a number of ceiling tiles that are supported by support members arranged in a grid. Various light fixtures can be used in connection with these ceiling grids, such as lights recessed the in ceiling tiles, lighting panels positioned in the grid (e.g., in place of ceiling tiles), and suspended light fixtures. While certain lighting devices can be coupled to the ceiling tile support members, these lighting devices suffer from several drawbacks and limitations. First, placement of these lighting devices is limited to due to the grid arrangement of the ceiling tile support members. In other words, these lighting devices generally must be arranged in exactly the same pattern as the grid so that they have adequate structural support. Second, even if these lighting devices were substantially flush to the ceiling tile support member(s) and/or ceiling tile(s), they typically include an opaque heat sink that blocks light from exiting the sides. As a result, these lighting devices form dark borders against the drop ceiling, which are aesthetically unappealing.

Further, many lighting devices include light emitting diodes (LEDs) as a light source, such as LED strips that are covered by a lens. However, lighting devices containing these LED strips suffer from several drawbacks and limitations, including hot spots on the lens, dark spots on the lens, uneven distribution of light on the lens, and the like. Further, while it may be possible to position two such lighting devices so that they have abutting surfaces (e.g., abutting ends), there will typically be a dark line or edge at the joint between the two lighting devices, which is aesthetically unappealing. The present disclosure is directed to solving these and other problems.

SUMMARY

According to some implementations of the present disclosure, a lighting device includes a housing, one or more light sources, a light guide panel, a lens, and one or more rotatable clips. The housing includes an internal cavity. The one or more light sources are disposed within the internal cavity of the housing. The light guide panel is disposed within the internal cavity of the housing and is configured to diffuse light emitted by the one or more light sources. The lens includes a base, a first side wall, and a second side wall defining an internal cavity, the lens being coupled to the housing such that at least a portion of the housing is disposed within the internal cavity of the lens and light diffused by the light guide panel is emitted through the base, the first side wall, and the second side wall of the lens. The one or more rotatable clips are coupled to the housing and are configured to mount the lighting device to an external structure.

According to some implementations of the present disclosure, a system includes a plurality of lighting devices and a plurality of rotatable clips. Each of the plurality of lighting devices include a housing, a light source, light guide panel, and a lens. The housing includes an internal cavity. The light source is disposed within the internal cavity of the housing. The light guide panel is disposed within the internal cavity of the housing and is configured to diffuse light emitted by the light source. The lens includes a base, a first side wall, and a second side wall, the lens being coupled to the housing such that diffused light from the light guide panel is emitted through the base, the first side wall, and the second side wall of the lens. Each of the plurality of rotatable clips are configured to couple to one of the plurality of lighting devices and one of a plurality of ceiling tile support members such that each of the plurality of lighting devices can be rotated relative to the plurality of ceiling tile support members.

According to some implementations of the present disclosure, a method includes removing a ceiling tile from a ceiling grid including a plurality of ceiling tile support members. The method also includes coupling a rotatable clip to a first one of the plurality of ceiling tile support members. The method also includes coupling a lighting device to the rotatable clip, the lighting device including a housing, a light source, a light guide panel configured to diffuse light emitted by the light source, and a lens including a base, a first side wall, and a second side wall, the lens being coupled to the housing such that at least a portion of the diffused light is emitted through the base, the first side wall, and the second side wall of the lens. The method also includes electrically coupling the lighting device to a power supply.

The above summary is not intended to represent each implementation or every aspect of the present disclosure. Additional features and benefits of the present disclosure are apparent from the detailed description and figures set forth below.

BRIEF DESCRIPTION OF THE DRAWINGS

FIG. 1 is a perspective view of a portion of a lighting device, according to some implementations of the present disclosure;

FIG. 3A is an end view of a lens of the lighting device of FIG. 1, according to some implementations of the present disclosure;

FIG. 3B is an end view of a first bracket of the lighting device of FIG. 1, according to some implementations of the present disclosure;

FIG. 3C is an end view of a second bracket of the lighting device of FIG. 1, according to some implementations of the present disclosure;

FIG. 10A is a perspective view of the lighting device of FIG. 1 being positioned along a ceiling tile grid, according to some implementations of the present disclosure;

FIG. 10B is a perspective view of rotatable clips coupled to the ceiling tile grid, according to some implementations of the present disclosure;

FIG. 10C is an end view of the lighting device coupled to the ceiling tile grid via one or more rotatable clips, according to some implementations of the present disclosure;

FIG. 10D is a perspective view of the lighting device coupled to the ceiling tile grid via one or more rotatable clips, according to some implementations of the present disclosure;

FIG. 12 is a plan view of a plurality of lighting devices coupled to a ceiling tile grid with a triangular ceiling tiles, according to some implementations of the present disclosure; and FIG. 13 is a plan view of a plurality of lighting devices couples to a ceiling tile grid with a triangular and parallelogram ceiling tiles according to some implementations of the present disclosure.

Figure 2A:
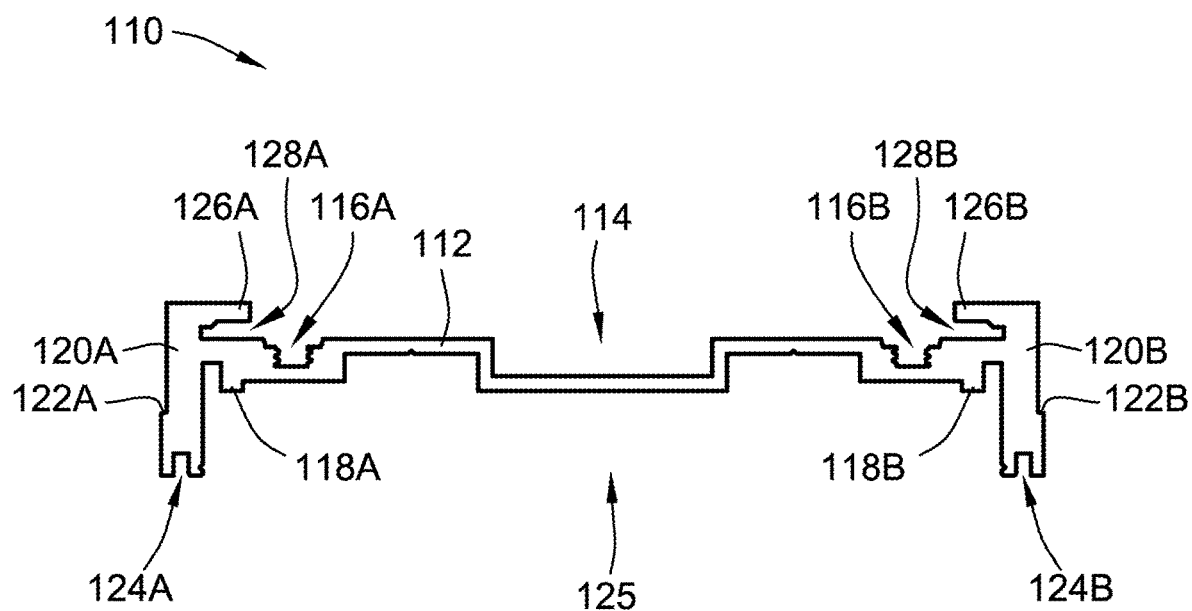
FIG. 2A is an end view of a housing of the lighting device of FIG. 1, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Referring generally to FIGS. 1-6, a lighting device 100 according to some implementations of the present disclosure is illustrated. The lighting device 100 generally includes a housing 110, a lens 130, a first bracket 140A, a second bracket 140B, a light source 150, a light guide panel 160, a rotatable clip 170, and a power cable 190. Generally, the lighting device 100 is mounted to an external structure or surface via the rotatable clip 170, such as a ceiling tile support member that is part of a ceiling tile grid. Advantageously, the rotatable clip 170 allows the lighting device 100 to be rotated relative to the ceiling tile support member, thereby allowing the lighting device 100 to be arranged in various orientations relative to the ceiling tile grid.

Further, as described herein, in some implementations, a plurality of lighting devices that are the same as, or similar to, the lighting device 100 can be included in a lighting system wherein each of the plurality of lighting devices are mounted to an external structure or surface, such as ceiling tile support members. In such implementations, the plurality of the lighting devices (e.g., two lighting devices, three lighting devices, four lighting devices, six lighting devices, etc.) can be arranged on a ceiling tile grid in a geometric pattern, such as, for example, a line, a rectangle, a square, a triangle, a parallelogram, a hexagon, etc.

Figure 2B:
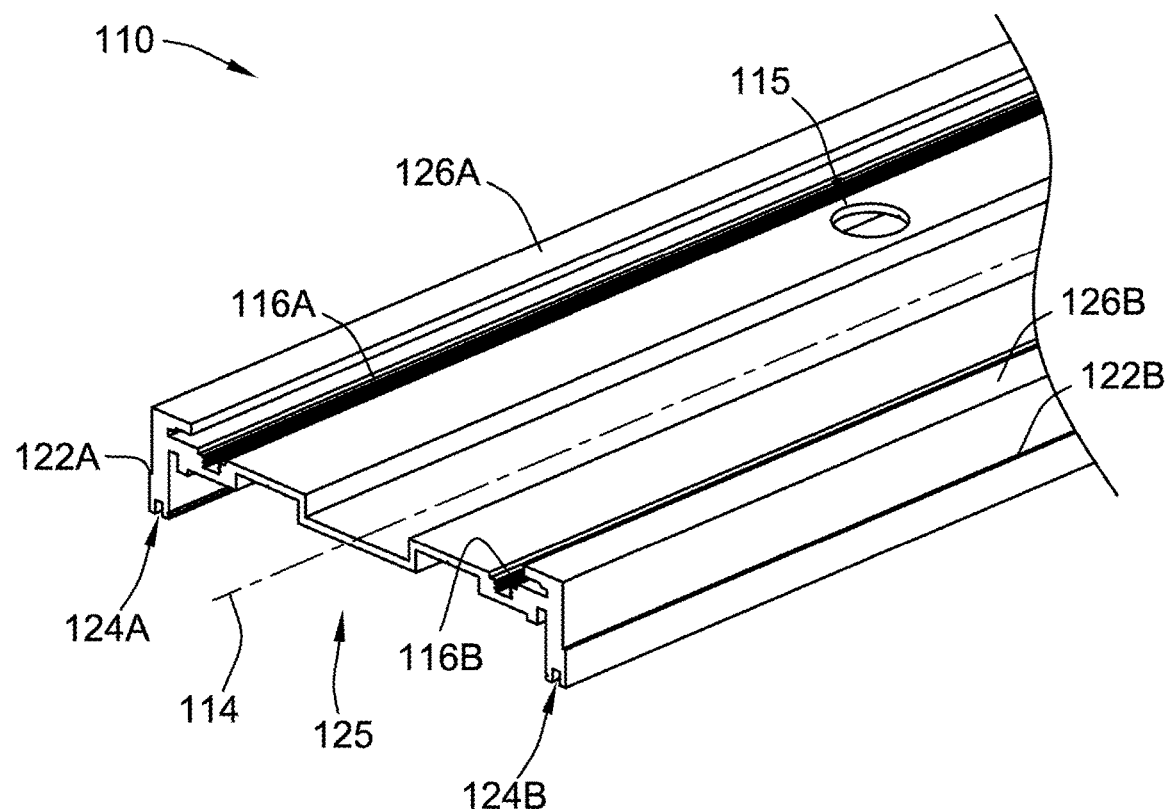
FIG. 2B is a perspective view of a portion of the housing of the lighting device, according to some implementations of the present disclosure.
Figure 4:
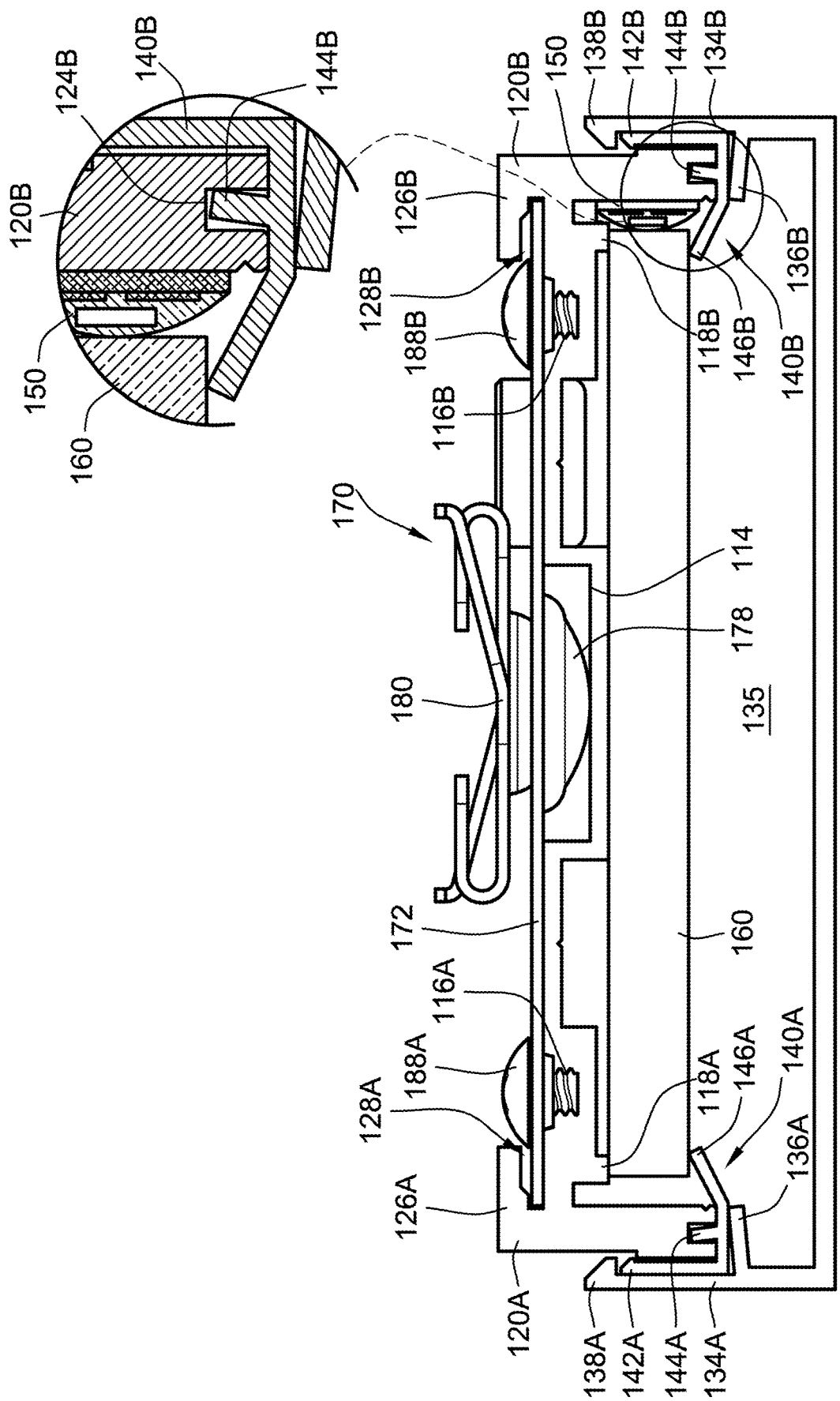
FIG. 4 is a cross-sectional view of the lighting device of FIG. 1, according to some implementations of the present disclosure.

Referring to FIGS. 2A and 2B, the housing 110 of the lighting device 100 includes a base 112, a first side wall 120A, and a second side wall 120B. The base 112, the first side wall 120B, and the second side wall 120B generally define an internal cavity 125. The base 112 includes a central groove 114, a first threaded groove 116A, and a second threaded groove 116B. As shown in FIG. 2B, the central groove 114, the first threaded groove 116A, and the second threaded groove 116B extend along a longitudinal axis of the housing 110 (e.g., along the entire length of the housing 110). The central groove 114 has a generally rectangular profile, and as described herein, is sized and shaped to receive a portion of the rotatable clip 170 therein. The first threaded groove 116A includes threads configured to engage a threaded fastener (e.g., a screw) to aid in coupling the rotatable clip 170 to the housing 110. The first threaded groove 116A can include a countersink or counterbore for receiving a portion of the fastener therein. The second threaded groove 116B is the same as, or similar to, the first threaded groove 116A. The base 112 also includes a first protrusion 118A and a second protrusion 118B extending from a lower surface that, as described herein, contact the light guide panel 160 when the lighting device 100 is assembled (FIG. 4). As shown in FIG. 2B, the base 112 also includes an aperture 115 for allowing the power cable 190 to be fed through the housing 110.

The first side wall 120A extends generally perpendicular to the base 112 and includes a first ledge 122A and a first slot 124A. The first ledge 122A and the first slot 124A aid in coupling the lens 130 to the housing 110. The first side wall 120A also includes a first flange 126*a* extending laterally towards a center of the housing 110 to define a first lateral groove 128A between an upper surface of the base 112 and the first flange 126*a*. The first flange 126*a* and the first lateral groove 128A aid in coupling the rotatable clip 170 to the housing 110. As shown in FIG. 2B, the first ledge 122A, the first slot 124A, and the first flange 126*a* extend along the longitudinal axis of the housing 110 (e.g., along the entire length of the housing 110). The second side wall 120B is the same as, or similar to, the first side wall 120A and includes a first ledge 122B and a first slot 124B that are the same as, or similar to, the first ledge 122A and the first slot 124A, respectively. The second side wall 120B includes a second flange 126*b* extending laterally towards the center of the housing 110 to define a second lateral groove 128B between the upper surface of the base 112 and the second flange 126*b*.

In some implementations, the housing 110 comprises aluminum and acts as a heat sink that aids in absorbing and/or distributing heat generated by the light source 150. The base 112, the first side wall 120A, and the second side wall 120B are shown as being unitary and/or monolithic (e.g., formed as a single aluminum extrusion). However, in other implementations, one or more of the 112, the first side wall 120A, and the second side wall 120B can be separate components that are coupled to one another (e.g., welded together).

Referring to FIG. 3A, the lens 130 includes a base 132, a first side wall 134A, and a second side wall 134B. The first side wall 134A and second side wall 134B generally extend perpendicular to the base 132 such that the base 132, the first side wall 134A, and the second side wall 134B generally define an internal cavity 135. The first side wall 134A includes a first ridge 136A and a first hook 138B, which extend along a longitudinal axis of the lens 130 (e.g., along the entire length of the lens 130). Similarly, the second side wall 134B includes a second ridge 136B and a second hook 138B that are the same as, or similar to, the first ridge 136A and the first hook 138B. The lens 130 generally comprises a material (e.g., a polymer) for allowing light to pass through so that light emitted from a light source in the internal cavity 135 is emitted outside of the lens 130. By contrast, the housing 110 generally comprises a material (e.g., aluminum) that does not allow light to pass through. In some implementations, the lens 130 includes a frosted surface (e.g., roughened, textured, or patterned) to aid in diffusing light in multiple directions.

Referring to FIG. 3B, a first bracket 140A includes a first hook 142A, a first protrusion 144A, and a first angled portion 146A. As described below, the first bracket 140A aids in coupling the lens 130 to the housing 110. The first bracket 140A can also aid in protecting a light source (e.g., from mechanical damage during handling or assembly of the lighting device 100) and/or securing the light guide panel 160 between the housing 110 and the lens 130. Referring to FIG. 3C, second bracket 140B, which is the same as, or similar to, the first bracket 140A (FIG. 3B) includes a second hook 142B, a second protrusion 144B, and a second angled portion 146B, which are the same as, or similar to, the first hook 142A, the first protrusion 144A, and the first angled portion 146A, respectively. In some implementations, the first bracket 140A and/or second bracket 140B extend along substantially the entire length of the housing 110 when assembled within the lighting device 100.

Referring to FIG. 4, the lens 130 is coupled to the housing 110 such that at least a portion of the housing 110 is disposed within the internal cavity 135 of the lens 130. To aid in coupling the housing 110 to the lens 130, the first bracket 140A is positioned between the first side wall 120A of the housing 110 and the first side wall 134a of the lens 130. More specifically, the first bracket 140A is positioned such that the first hook 142A is coupled to (e.g., via a snap fit) the first ledge 122A of the first side wall 120A of the housing 110. Additionally, the first protrusion 144A of the first bracket 140A is disposed within the first slot 124A of the first side wall 120A of the housing 110. In turn, the first bracket 140A is positioned between the first ridge 136A and the first hook 138A of the first side wall 134a of the lens 130, forming a snap fit connection between the lens 130 and the first bracket 140A.

Similar to the first bracket 140A, the second bracket 140B is positioned between the second side wall 120B of the housing 110 and the second side wall 134b of the lens 130. More specifically, the second bracket 140B is positioned such that the second hook 142B is coupled to (e.g., via a snap fit) the second ledge 122B of the second side wall 120B of the housing 110. Additionally, the second protrusion 144B of the second bracket 140B is disposed within the second slot 124B of the second side wall 120A of the housing 110. In turn, the second bracket 140B is positioned between the second ridge 136B and the second hook 138A of the second side wall 134b of the lens 130, forming a snap fit connection between the lens 130 and the second bracket 140B.

Generally, the light source 150 emits light having a predetermined wavelength (e.g., between about 400 nm and about 700 nm), which in turn is emitted from the lighting device 100 through the lens 130. As shown in FIG. 4, the light source 150 is disposed within the internal cavity 115 of the housing 110 and is coupled to an inner surface of the second side wall 122A of the housing 110 (e.g., via one or more double sided adhesive strips). In some implementations, the light source 150 generally extends along substantially an entire length of the second side wall 122A of the housing 110.

In some implementations, the light source 150 includes a plurality of light emitting diodes (LEDs) that emit light having a predetermined wavelength. The plurality of LEDs can include white LEDs, blue LEDs (e.g., III-nitride LEDs), red LEDs, green LEDs, yellow LEDs, amber LEDs, orange LEDs, infrared LEDs, ultraviolet LEDs, or any combination thereof. The plurality of LEDs can be dimmable (e.g., together or individually controllable). The plurality of LEDs can be mounted to a support substrate (e.g., a rigid board/plate, a flexible strip/film, printed circuit board, etc.), which in turn is coupled to the second side wall 122B of the housing 110. Generally, the plurality of LEDs can be mounted to the support substrate using any suitable package (e.g., a surface mount package, a chip-on-board package, a through-pin package, etc.). Further, the plurality of LEDs can be electrically coupled to one another using any suitable mechanism or technique (e.g., in series, in parallel, via wiring, via traces, etc.). In some implementations, the plurality of LEDs can be at least partially surrounded by an encapsulant that protects the plurality of LEDs (e.g., from mechanical damage) and/or modifies the light emission characteristics. For example, the encapsulant can include a wavelength converter (e.g., a phosphor material) that converts a first wavelength of light emitted by the LEDs (e.g., blue) to a second wavelength of light (e.g., white), which is then emitted from encapsulant.

In some implementations, the lighting device 100 includes a plurality of light sources that are the same as, or similar to, the light source 150. For example, the lighting device 100 can include a plurality of light sources that are each coupled to the second side wall 120B of the housing 110. As another example, in some implementations, the lighting device 100 can include a first light source coupled to the second side wall 122B of the housing 110 (as shown in FIG. 4) and a second light source coupled to the first side wall 122A of the housing 110. In such implementations, the first light source and the second light source can emit different wavelengths of light (e.g., the first light source emits white light and the second light source emits one or more other colors).

The light source 150 receives power from the power cable 190, which is fed through the aperture 115 (FIG. 2B) in the housing 110. As shown in FIG. 1, the power cable 190 includes a connector 192 that can be coupled to a power supply (e.g., an AC electrical outlet). In some implementations, the connector 192 is coupled to a power feed wire via another connector, and in turn the power feed wire is coupled to the power supply. In some implementations, the power feed wire includes a AC/DC converter for converting power from an AC electrical outlet. In some implementations, the lighting device 100 further includes a power supply enclosure that includes one or more constant voltage or constant current drivers (e.g., three drivers) for powering the light source 150. As described herein, the lighting device 100 can be used in system including multiple lighting devices. In such implementations, the connector 192 can be coupled to a power supply enclosure that is also coupled to connectors from one or more additional lighting devices that are the same as, or similar to, the lighting device 100.

The light guide panel 160 generally aids in diffusing light emitted by the light source 150. In some implementations, the light guide panel 160 comprises an acrylic material that aids in diffusing light across substantially the entire length and width of the light guide panel 160. The light guide panel 160 has a generally rectangular profile and extends along substantially the entire length of the housing 110 and/or the light source 150. The light guide panel 160 does not include any fasteners (e.g., screws) that couple to the housing 110 because such fasteners would cause dark spots where light would not be emitted from the light guide panel.

To aid in avoiding such dark spots, the light guide panel 160 can be coupled to the housing 110 via an adhesive (e.g., one or more double sided adhesive strips, which can be reusable). In such implementations, the adhesive strip(s) can have a width of about 0.375 inches and a length of about 3 inches. In some cases, heat generated by the light guide panel 160 may cause degradation of the adhesive strip(s) (e.g., reducing its holding power). Thus, the adhesive strip preferably has a heat resistance rating of about 120 degrees Fahrenheit. To secure the light guide panel 160 the housing 110, the adhesive strip can have a peel adhesion that is between about 35 oz/in (N/100 mm) and about 70 oz/in (N/100 mm). In one non-limiting example, the adhesive strip is a 3M™ Flexographic Plate Mounting Tape or a 3M™ Cushion-Mount™ Printing Tape, which is generally used for mounting flexographic print plates to cylinders or sleeves. Such double-sided tapes are particularly advantageous for coupling the light guide panel 160 to the housing 110, for example, due to their holding power and heat resistance. Another non-limiting example, the adhesive strip can be a 3M™ Cushion-Mount™ Plus Standard Combination Plate Mounting Tape, Product Number E1040H.

In some implementations, a first side of the light guide panel 160 includes a laminate or film that further aids in extracting and diffusing light from the light guide panel 160. In such implementations including the laminate/film, the light guide panel 160 preferably has a width that is about 2.875 inches or less (e.g., 1.75 inches). The film can be a matte polyester film coated with a pressure sensitive acrylic adhesive and a release liner backing. In one non-limiting example, the film on the light guide panel 160 can be a FLEXcon COMPUcall II® PM 100 C MTC-329 L-23 58PW-8 film. In some implementations, the light guide panel 160 includes a first end or end that is clear and a second end or edge including reflective tape (e.g., silver or white). The reflective tape prevents light from escaping the second edge of the light guide panel and reflects the light back towards the first edge, thereby increasing light diffusion and extraction out of the light guide panel 160.

As shown in FIG. 4, the light guide panel 160 is positioned between the first angled portion 148A of the first bracket 140A, the second angled portion 148B of the second bracket 140A, the first protrusion 118A of the housing 110, and the second protrusion 118B of the housing 110. The light source 150 is positioned between the second side wall 122B of the housing 110, the light guide panel 160, and the second bracket 140B. This arrangement aids in inhibiting physical contact between the light source 150 and another object or a user (e.g., if the lens 130 were removed).

While the light source 150 emits in multiple directions, the light source 150 generally emits light towards the first side wall 122A of the housing 110 in a first direction. This light passes into the light guide panel 160, which also emits light in a plurality of directions, but generally in a second direction towards the base 132 of the lens 130. The light source 150 and the light guide panel 160 are arranged such that the first direction is generally perpendicular to the second direction. Many lighting devices do not use a light guide panel; instead, they use one or more LED light strips that are coupled to the fixture housing. Using the light guide panel 160 is advantageous over such arrangements in that the light guide panel 160 evenly distributes light across substantially its entire width and length, aids in preventing or reducing hot spots on the lens 130, and aids in preventing or reducing darks spots on the lens 130. Further, diffusion of the light by the light guide panel 160 aids in causing light to be emitted through the first side wall 134a and the second side wall 134b of the lens 130 (e.g., as opposed to only through the base 132 of the lens 130).

Coupling the lens 130 to the housing 110 such that a portion of the lens 130 wraps around the housing 110 is advantageous for several reasons. In many lighting devices, a lens may be disposed within the housing (e.g., heat sink) such that the housing warps around the edges of the lens. However, in this arrangement, the housing blocks light from passing through the sides of the lens. By contrast, the arrangement of the lens 130 and the housing 110 in the lighting device 100 permits a portion of the light diffused by the light guide panel 160 to be emitted not only through the base 132 of the lens 130, but at least a portion of the first side wall 134a and the second side wall 134b of the lens 130 (e.g., at least the portion of the first side wall 134a between the first ridge 136A and the base 132 and at least the portion of the second side wall 134b between the second ridge 136B and the base 132). Accordingly, light will be emitted from multiple surfaces of the lens 130 (e.g., not just the bottom surface), which is particularly advantageous when the lighting device 100 is mounted to an external surface, such as a ceiling tile grid. Light emitted from the first side wall 134a and second side wall 134b of the lens 130 hides or obscures the housing 110 when the lighting device 100 is mounted to a ceiling tile grid and aids in reducing the contrast borders of a dark ceiling for a more aesthetically pleasing appearance. The light emitted from the lens 130 also creates a halo lighting effect that counters the cave lighting effect that is typical for recessed light fixtures.

Figure 5:
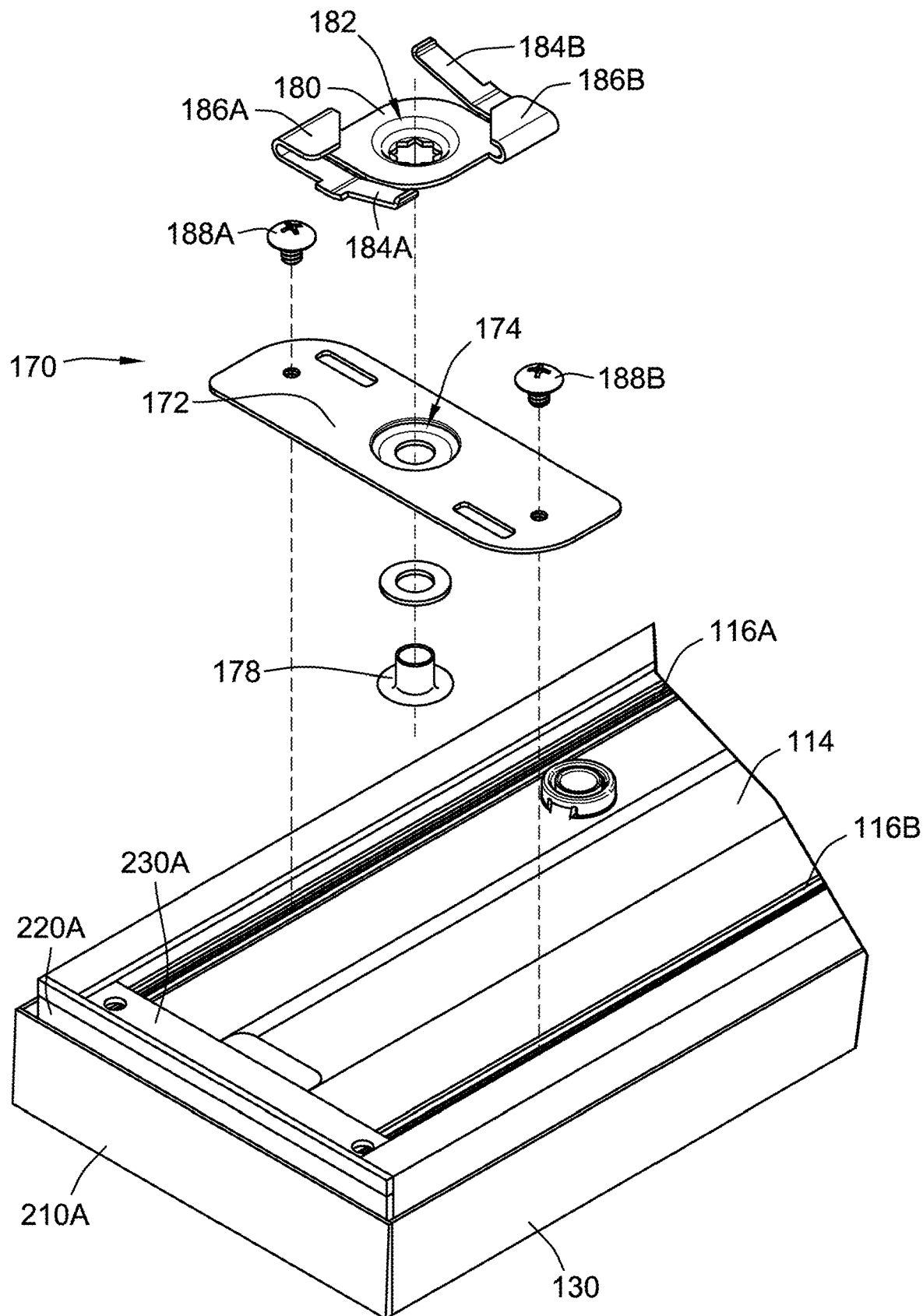
FIG. 5 is an exploded view of a rotatable clip and a portion of the housing of the lighting device of FIG. 1, according to some implementations of the present disclosure.

Referring to FIG. 5, the rotatable clip 170 includes a base plate 172 and a rotatable portion 180. The base plate 172 includes an aperture 174 for receiving a rivet 178 therein for coupling the rotatable portion 180 to the base plate 172. The base plate 172 is sized and shaped such that a first portion can be received within the first lateral groove 128A of the housing 110 and a second portion can be received within the second lateral groove 128B of the housing 110 to aid in coupling the rotatable clip 170 to the housing 110. As shown, the base plate 172 includes opposing curved edges, which aid in permitting lateral movement of the base plate 172 relative to the housing 110 with the edges engaged by the first lateral groove 128A and the second lateral groove 128B of the housing 110. Lateral movement of the base plate 172 relative to the housing 110 allows an installer to position the rotatable clip 170 at any location along the length of the housing 110. The base plate 172 also includes a first aperture 176A and a second aperture 176B so that the base plate 172 can be coupled to the housing 110A via a first fastener 188A that threadingly engages the first threaded groove 116A of the housing 110 and a second fastener 188B that threadingly engages the second threaded groove 116B of the housing 110 (e.g., as shown in FIG. 1). Additionally, the rivet 178 is disposed within the central groove 114 of the housing 110 when the rotatable clip 170 is coupled to the housing 110.

The rotatable portion 180 includes an aperture 182, a first deflectable arm 184A, a second deflectable arm 184B, a first clasp 186A, and a second clasp 186B. The first deflectable arm 184A and the second deflectable arm 184B are moveable relative to the rest of the rotatable portion 180. As described herein, the deflectable arm 184A, the second deflectable arm 184B, the first clasp 186A, and the second clasp 186B engage edges of a ceiling tile support member to mount the lighting device 100 to a ceiling grid. The rotatable portion 180 is coupled to the base plate 172 via the rivet 178 (which extends through the aperture 182) such that the rotatable portion 180 can rotate 360 degrees relative to the base plate 172. When the base plate 172 is coupled to the housing 110, the rotatable portion 180 can rotate 360 degrees relative to the base plate 172 and the housing 110. Similarly, when the rotatable portion 180 is mounted to a ceiling tile support member, the entire lighting device 100 can rotate 360 degrees relative to the ceiling tile support member.

While the lighting device 100 is shown as including one rotatable clip 170, in some implementations, the lighting device 100 includes a plurality of rotatable clips that are the same as, or similar to, the rotatable clip 170. For example, in such implementations, the lighting device 100 can include a plurality of rotatable clips coupled to the housing at a predetermined interval (e.g., every 12 inches, every 18 inches, every 24 inches, every 36 inches, etc.). The rotatable clip 170 comprises a metal material (e.g., steel, aluminum, etc.), although other materials are contemplated (e.g., polymers). The base plate 172 and the rotatable portion 180 can comprise the same material, or different materials (e.g., the base plate 172 comprises a metal and the rotatable portion 180 comprises a polymer).

Figure 6:
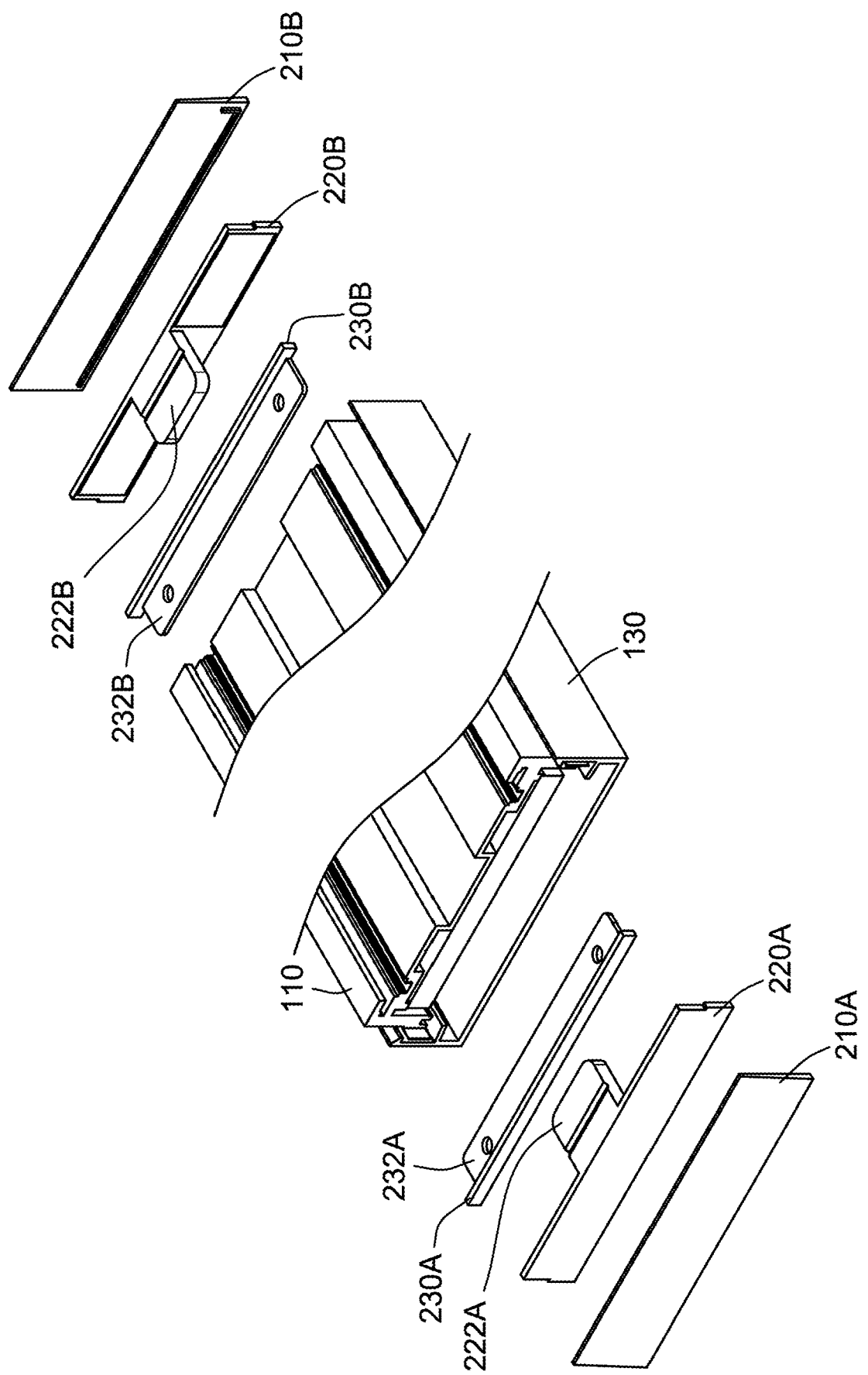
FIG. 6 is a partial exploded view of the lighting device of FIG. 1 including and lens end caps, housing end caps, and finishing caps, according to some implementations of the present disclosure.

Referring to FIGS. 5 and 6, in some implementations, the lighting device 100 includes a first lens end cap 210A, a first housing end cap 220A, and a first finishing end cap 230A on a first end of the lighting device 100 (FIGS. 5 and 6) and/or a second lens end cap 210B, a second housing end cap 220B, and a second finishing end cap 230B on a second end of the lighting device 100 (FIG. 6). The first lens cap 210A is coupled to (e.g., adhered to) the first side wall 134A, the second side wall 134A, and the base 132 of the lens 130 to enclose the end of the lens 130. The first lens end cap 210A can comprise the same material as the rest of the lens 130, or a different material or finish. The second lens cap 210B (FIG. 6) is the same as, or similar to, the first lens cap 210A.

The first housing end cap 220A abuts a first end of the first side wall 120A, the second side wall 120B, and the base 112 of the housing 110. The housing end cap 220 includes a tongue 222A that engages the central groove 114 of the housing 110 to couple the housing end cap 220 to the housing 110 (e.g., via a press or interference fit). The first housing end cap 220A creates a flush surface at the end of the lighting device 100 and inhibits light from the light source 150 and/or light guide panel 160 from being emitted out of the end of the housing 110. The second housing end cap 220B is the same as, or similar to, the first housing end cap 220B and is coupled to a second, opposing end of the lighting device 100 (FIG. 6).

The first finishing end cap 230A abuts the first housing end cap 220A and includes a tongue 232A that is received within the first lateral groove 128A and the second lateral groove 128B of the housing 110 to couple the finishing end cap 230 to the housing 110. Together, the first housing end cap 220A and first finishing end cap 230A create a flush surface along the entire end of the housing 110. The second finishing end cap 230B is the same as, or similar to, the first finishing end cap 230A and includes a tongue 232B that is the same as, or similar to, the tongue 232A of the first finishing end cap 230A.

Figure 7:
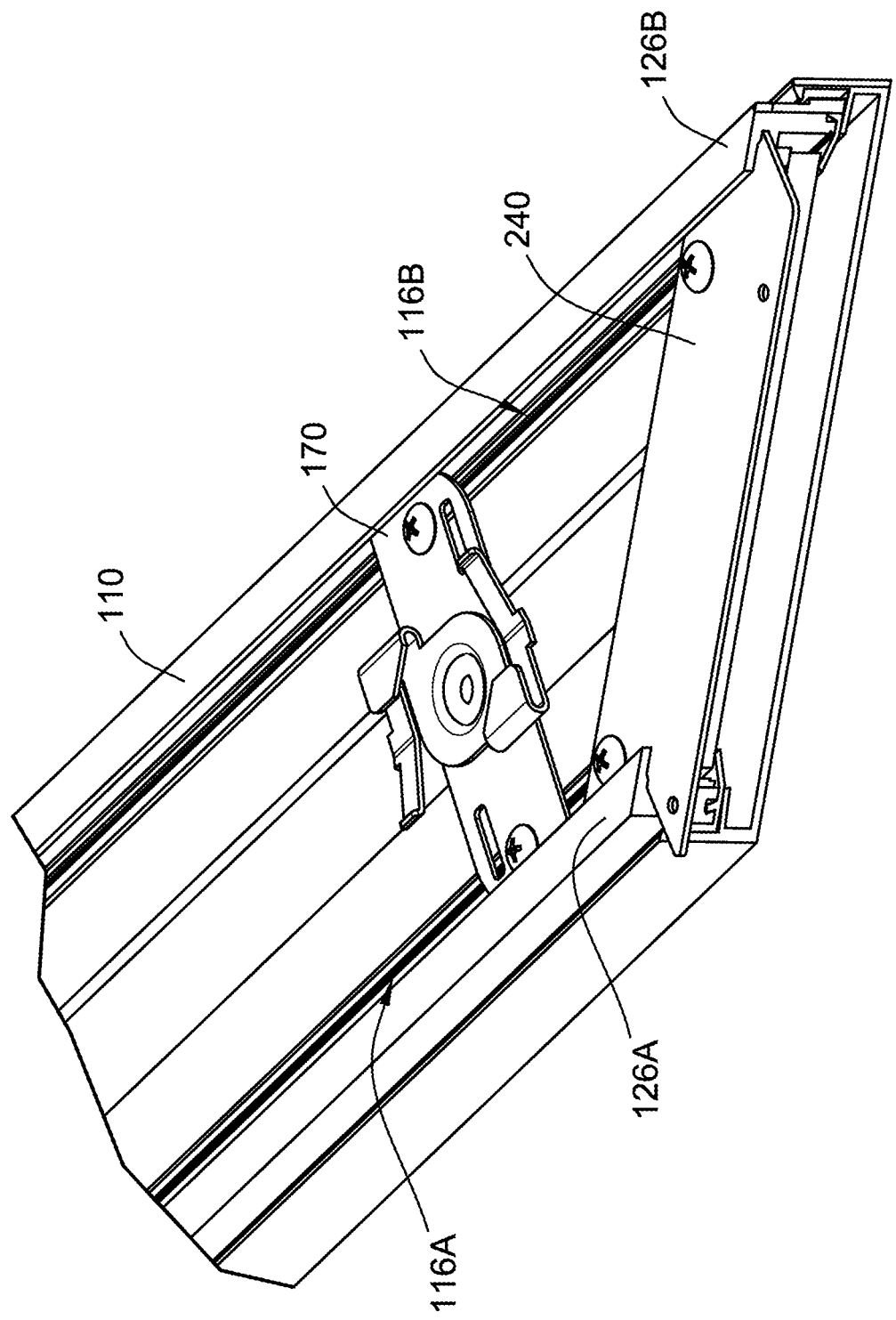
FIG. 7 is a perspective view of an end of the lighting device of FIG. 1 including an alignment plate, according to some implementations of the present disclosure.

Referring to FIG. 7, in some implementations, the lighting device 100 includes the first lens end cap 210A, the first housing end cap 220A, and an alignment plate 240 (instead of the finishing end cap 230A). The alignment plate 240 is generally used to couple the lighting device 100 to another lighting device that is the same as, or similar to, the lighting device 100. The alignment plate 240 is received within lateral groove 128A and the second lateral groove 128B of the housing 110 to couple the alignment plate 240 to the housing 110. Further, the alignment plate 240 includes apertures for receiving fasteners (e.g., screws) therein, which threadingly engage the first threaded groove 116A and the second threaded groove 116B of the housing 110 to couple the alignment plate 240 to the housing 110. A shown in FIG. 7, the lighting device 100, in some implementations, can have a mitered end (e.g., an angled end as opposed to a straight end) for abutting another lighting device. In such implementations, the miter angle can be between about 30 degrees and about 80 degrees (e.g., 45 degrees, 60 degrees, 75 degrees, etc.). One or both ends of the lighting device 100 can have a mitered end.

Figure 8:
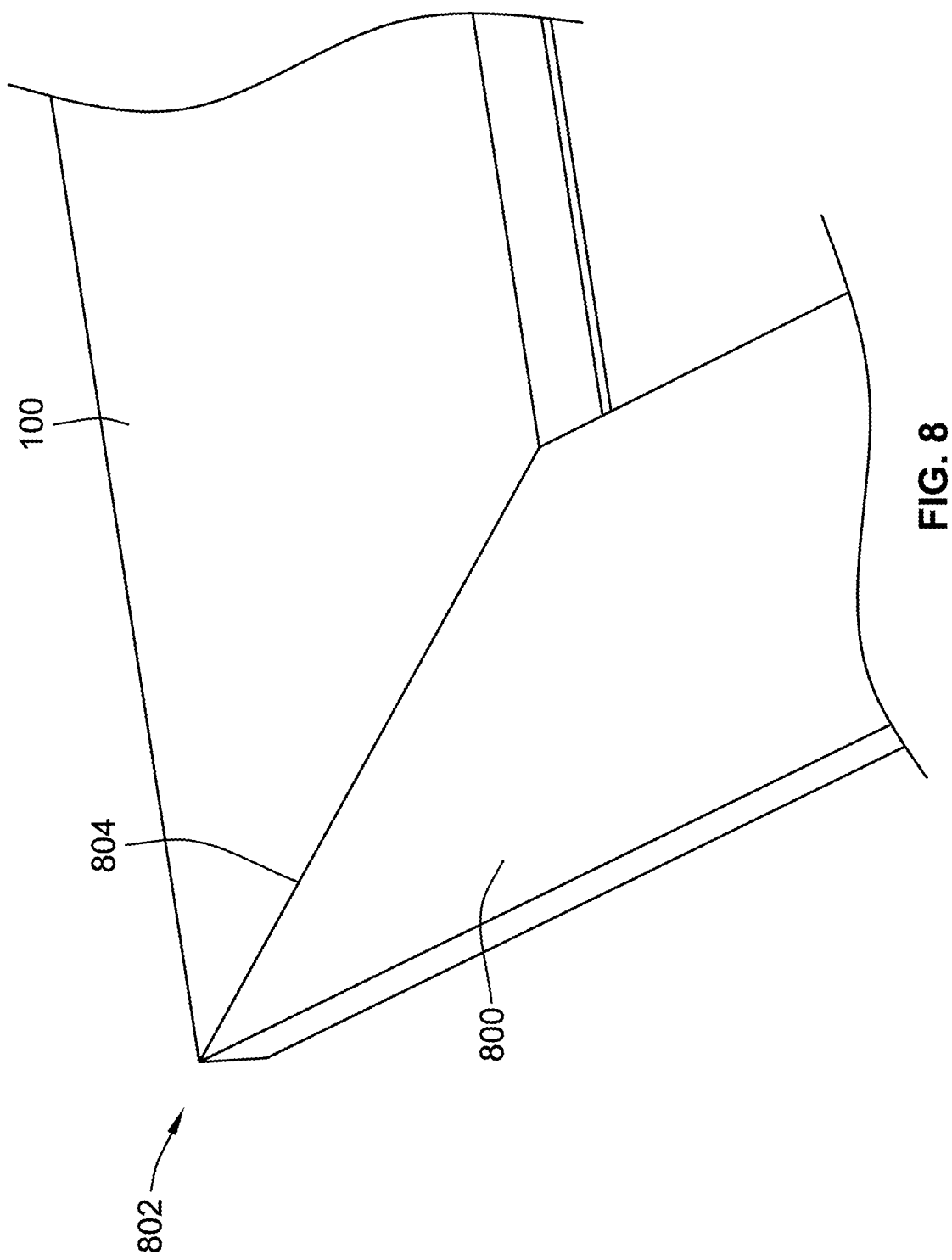
FIG. 8 is a perspective view of a portion of the lighting device including a mitered end and abutting another lighting device to form a miter joint, according to some implementations of the present disclosure.

As described herein, the lighting device 100 can be arranged (e.g., when coupled to a ceiling tile support member via the rotatable clip 170) so that an end abuts an end of another lighting device. The alignment plate 240 aids in aligning the lighting device 100 with the other lighting device so that the edges are flush. This aids in preventing or reducing any dark lines/edges in the emitted light at the joint or juncture between the lighting device 100 and the other lighting device, giving an appearance that the lighting device 100 and the other lighting device are a single, unitary lighting device. For example, referring to FIG. 8, the lighting device 100 can be arranged to abut another lighting device 800 that is the same as, or similar to, the lighting device 100 to form a miter joint 802 (e.g., a 90-degree angle). As shown, there is a miter seam or edge 804 between the lighting device 100 and the lighting device 800. As described above, the light guide panel in each of the lighting devices aids in diffusing light such that there is not a dark line or edge at the miter seam 804 between the lighting device 100 and lighting device 800, which would otherwise occur if the lighting devices did not use a light guide panel. In other words, the miter joint 802 gives the appearance of a single, unitary lighting device, as opposed to two separate lighting devices that abut one another.

The lighting device 100 described herein can have a variety of shapes and sizes. For example, in some implementations, the lighting device 100 has a centerline length that is between about 24 inches and about 72 inches (e.g., 24 inches, 30 inches, 48 inches, 60 inches, 72 inches, etc.). In some implementations, the lens 130 of the lighting device 100 has a width that is between about 2 inches and about 6 inches (e.g., about 3.5 inches). In some implementations, the lighting device 100 has a depth (e.g., measured from an upper surface of the housing 110 to a lower surface of the lens 130) that is about 1 inch.

As discussed above, the lighting devices described herein can be mounted to a ceiling tile grid. The ceiling tile grid can include any number of ceiling tiles and ceiling tile support members (e.g., brackets with a T-shaped cross-section). The ceiling tiles in the ceiling tile grid can be rectangular, square, triangular, parallelograms, hexagons, or any combination thereof, with the ceiling tile support members arranged in a corresponding pattern to support the ceiling tiles. The ceiling tiles can be, for example, flat lay-in or tegular ceiling tiles.

Figure 9:
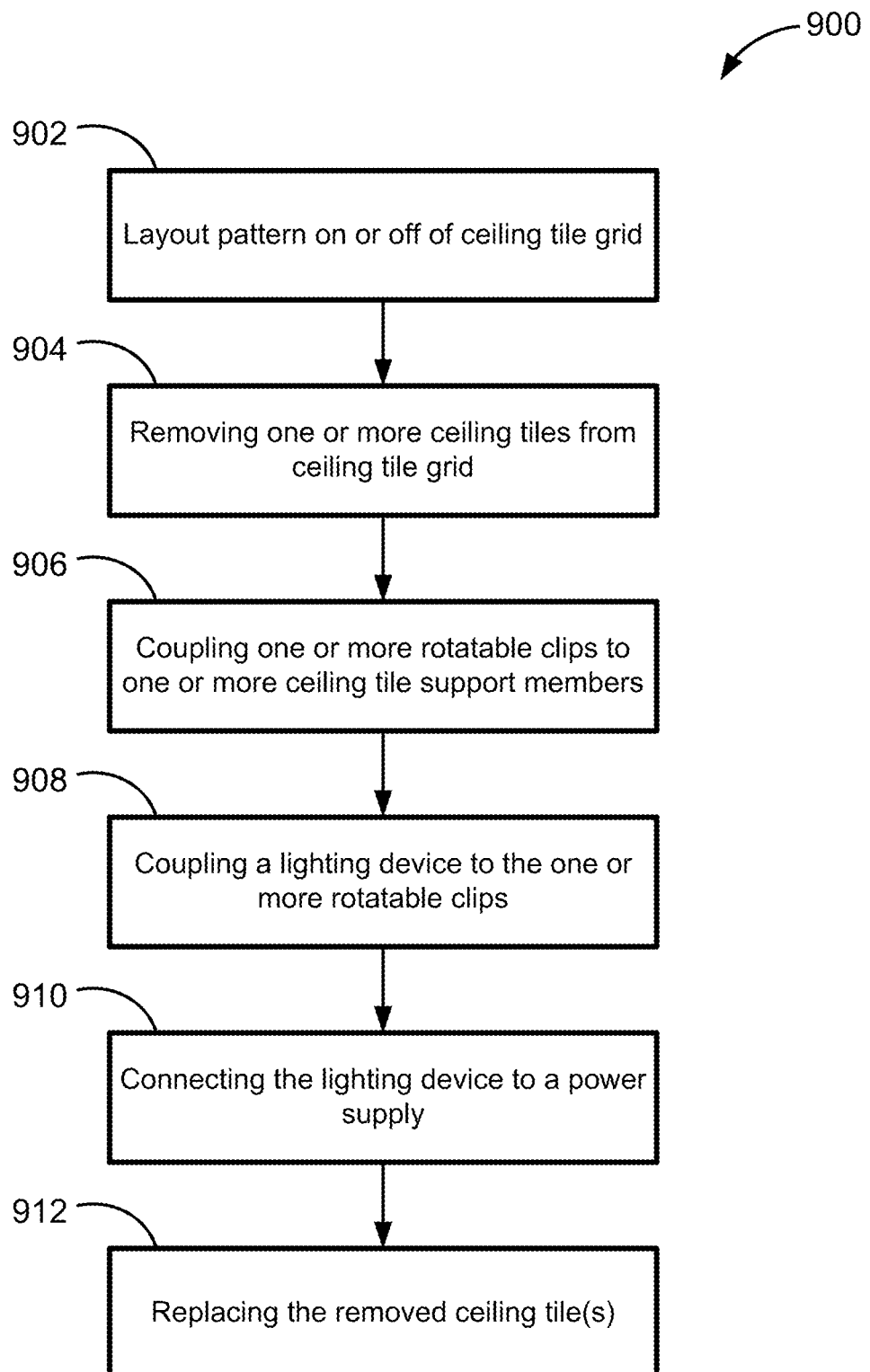
FIG. 9 is a process flow diagram for a method of installing one or more lighting devices on a ceiling tile grid, according to some implementations of the present disclosure.

Referring to FIG. 9, a method 900 for installing a lighting device (e.g., the lighting device 100) on a ceiling tile grid according to some implementations of the present disclosure is illustrated. The method 900 can be implemented using any of the lighting devices described herein (e.g., the lighting device 100).

Step 901 of the method 900 includes laying out a pattern on the ceiling tile grid. For example, referring to FIG. 10A, step 901 can include positioning the lighting device 100 adjacent to a ceiling tile support member 1010A between a first ceiling tile 1002A and a second ceiling tile 1002B in a ceiling tile grid 1000. For example, the installer can mark on the ceiling tile support member 1010A where to couple the rotatable clip 170 of the lighting device 100. The pattern can be laid out in a number of ways. For example, the pattern can be laid out such that a longitudinal axis of the lighting device 100 is generally parallel and coincident with a longitudinal axis of the ceiling tile support member 1010A. As another example, the pattern can be laid out such that the longitudinal axis of the lighting device 100 at an angle (e.g., 90 degrees, 45 degrees, etc.) relative to the longitudinal axis of the ceiling tile support member 1010A.

Referring back to FIG. 9, step 902 of the method 900 includes removing one or more ceiling tiles from the ceiling tile grid. For example, as shown in FIG. 10B, the second ceiling tile 1002B can be at least partially removed from the ceiling tile grid 1000. Step 903 of the method 900 includes coupling one or more rotatable clips (e.g., that are the same as, or similar to, the rotatable clip 170) to a ceiling tile support member. For example, referring to FIG. 10B, a ceiling tile 1002B is removed from the ceiling tile grid 1000 and a first rotatable clip 170A is coupled to the first ceiling tile support member 20A and a second rotatable clip 170B is coupled to a second ceiling tile support member 20B. The first rotatable clip 170A and second rotatable clip 170B are the same as, or similar to, the rotatable clip 170 described above.

Referring again to FIG. 9, step 904 of the method 900 includes coupling a lighting device to the one or more rotatable clips (step 903). For example, referring to FIG. 10C, the lighting device 100 can be coupled to the first rotatable clip 170A and the second rotatable clip 170B (FIG. 10B). To do so, the installer can position the lighting device 100 such that the base plate of the rotatable clip slides into the first lateral groove 128A and second lateral groove 128B (FIG. 2A) of the housing 110 of the lighting device 100. Once the rotatable clip is positioned at a desired location along the length of the housing 110, the installer can secure the rotatable clip to the lighting device 100 using one or more fasteners (e.g., the fasteners 188A and 188B shown in FIG. 6) that engage the first threaded groove 116A and second threaded groove 116B of the housing 110 (FIG. 6).

Step 905 of the method 900 includes connecting the lighting device to a power supply. To do so, the installer can run the power cable 190 of the lighting device 100 above the ceiling tiles in the ceiling grid 100 and connect the power cable to a power supply (e.g., directly or via another feed cable). Step 906 can also include replacing the removed ceiling tile(s) from step 901, as shown in FIG. 10D. In some implementations, step 906 includes forming a notch in the ceiling tile to permit the power cable 190 to pass through the ceiling grid 1000 and not be visible or exposed. As shown in FIGS. 10C and 10D, the lighting device 100 is substantially flush with the ceiling tile grid 1000 when installed.

More specifically, in the exemplary arrangement shown in FIGS. 10C and 10D, an upper surface of the first flange 126A and an upper surface of the second flange 126B (FIGS. 2A and 2B) of the housing 110 generally contact surface of the ceiling tile 1002A and the ceiling tile 1002B so that there is no visible gap between the lighting device 100 and the ceiling tiles.

Figure 11:
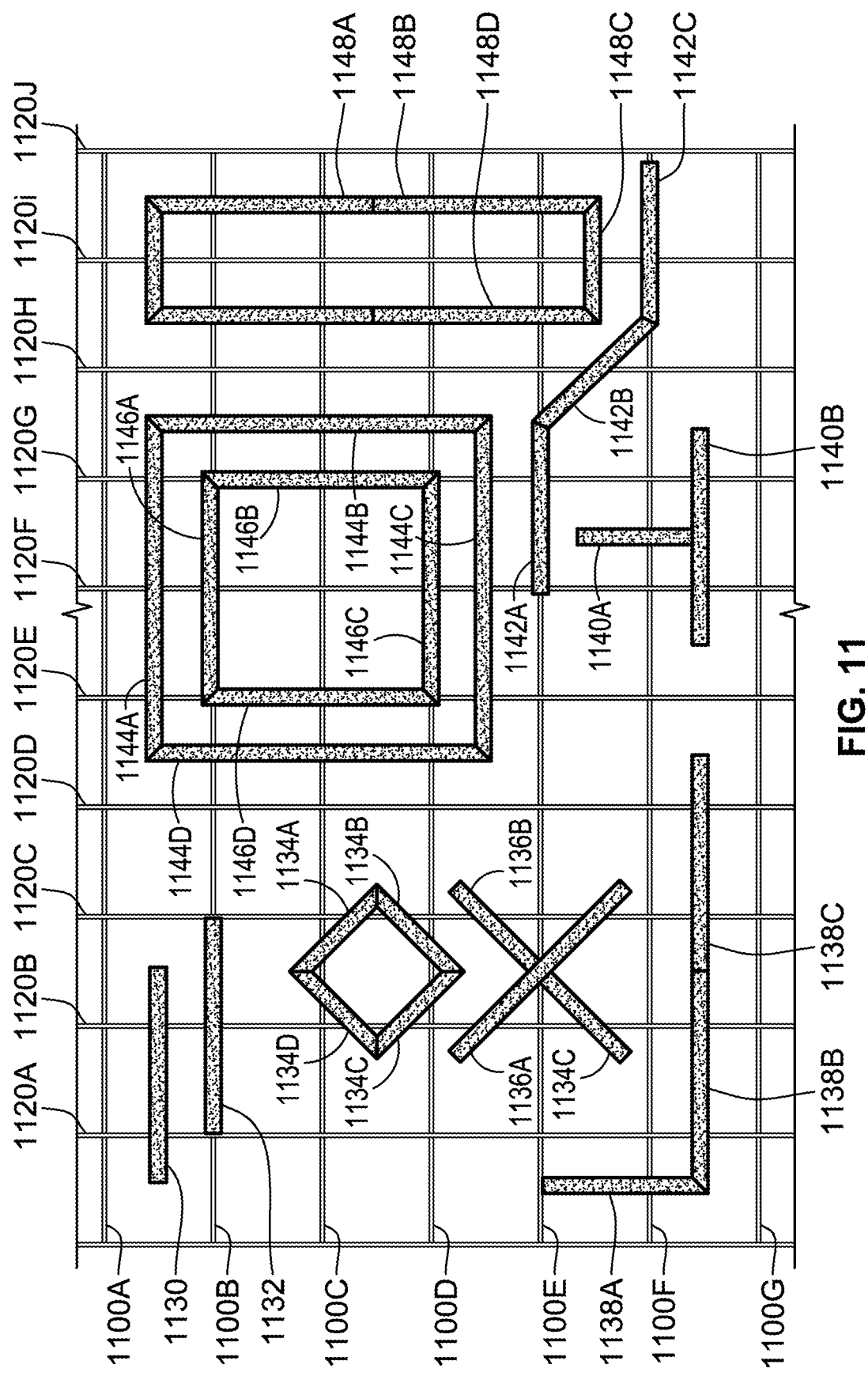
FIG. 11 is a plan view of a plurality of lighting devices coupled to a ceiling tile grid with rectangular ceiling tiles, according to some implementations of the present disclosure.

Referring to FIG. 11, one or more lighting devices forming a plurality of lighting systems are shown coupled to a ceiling tile grid 1100, according to some implementations of the present disclosure. The ceiling tile grid 1100 includes a first plurality of rows of ceiling tile support members 1110A-1110G and a second plurality of rows of ceiling tile support members 1120A-1120J. In this arrangement, the support members 1110A-1110G are perpendicular to the support members 1120A-1120J to form the ceiling tile grid 1100.

In FIG. 11, a first lighting device 1130 and a second lighting device 1132 that are the same, as or similar, to the lighting device 100 are coupled to the ceiling tile grid 1100. The first lighting device 1130 is coupled to ceiling tile support member row 1120A (e.g., using a first rotatable clip) and ceiling tile support member row 1120B (e.g., using a second rotatable clip) so that the longitudinal axis of the first lighting device 1130 is generally perpendicular to the ceiling tile support member row 1120A and the ceiling tile support member row 1120B. This configuration where the longitudinal axis of the first lighting device 1130 is perpendicular to the ceiling tile support members it is coupled to can be referred to as an off the grid configuration. Generally, in an off the grid configuration, the lighting device intersects at least two ceiling tile support members. The second lighting device 1132 is coupled is coupled to the ceiling tile support member row 1100B (e.g., using two rotatable clips) so that the longitudinal axis of the second lighting device 1132 is generally parallel with the ceiling tile support member row 1100B. This configuration where the second lighting device 1132 is parallel to or in line with the ceiling tile support member it is coupled to can be referred to as an on the grid configuration.

In FIG. 11, a first group of lighting devices 1134A-1134D are coupled to the ceiling tile grid and arranged in an off the grid diamond pattern. Each of the lighting devices 1134A-1134D have a first mitered end and a second mitered end. In this diamond arrangement, the longitudinal axis of each of the lighting devices 1134A-1134D is orientated at an angle relative to the ceiling tile support members to which it is coupled.

In FIG. 11, a second group of lighting devices 1136A-1136C are coupled to the ceiling tile grid 1100 in an off the grid x-shaped or cross pattern. Each of the lighting devices 1136A-1136C are the same as, or similar to, the lighting device 100. A first end of lighting device 1136B abuts the lighting device 1136A (e.g., approximately at the midpoint of the lighting device 1136A). The lighting device 1136C likely abuts the lighting device 1136A, thereby forming an x-shaped or cross pattern. The longitudinal axes of the lighting devices 1136A-1136C are orientated at angle relative to the ceiling tile support members to which they are attached.

Still referring to FIG. 11, a third group of lighting devices 1138A-1338A are coupled to the ceiling tile grid 1110 in an off the grid l-shaped pattern. The lighting devices 1138A and 1138B are the same as, or similar to, the lighting device 700 and the lighting device 800 (FIGS. 8A and 8B) described herein and form a 90-degree angle where a first end of the lighting device 1138A abuts a first end of the lighting device 1138B. More specifically, the lighting device 1138A is coupled to ceiling tile support member row 1100F and is orientated so that its longitudinal axis is perpendicular to ceiling tile support member row 1100F. The lighting device 1138B is coupled ceiling tile support members 1120A and 1120B and is orientated so that its longitudinal axis is perpendicular to ceiling tile support members 1120A and 1120B. The lighting device 1138C is positioned so that a first end of the lighting device 1138C abuts a second end of the lighting device 1138B.

Referring to FIG. 11, a fourth group of lighting devices 1140A and 1140B, which are the same as, or similar to, the lighting device 100 described herein, are coupled to the ceiling tile grid 1110 in an off the grid t-shaped pattern. The lighting device 1140A is coupled to ceiling tile support member row 1110F and the lighting device 1140B is coupled to ceiling tile support member rows 1120F and 1120G.

Referring still to FIG. 11, a fifth group of lighting devices 1142A-1142C are coupled to the ceiling tile grid 1110 in an arrangement that is partially off the grid and partially on the grid. Specifically, the lighting device 1142A is coupled to ceiling tile support member row 1100E and the lighting device 1142C is coupled to ceiling tile support member row 1100F. The lighting device 1142B has a first mitered end and a second mitered end that abut respective mitered ends of the lighting device 1142A and the lighting device 1142C.

Referring to FIG. 11, a sixth group of lighting devices 1144A-1144D are coupled to the ceiling tile grid 1110 in an off the grid rectangular arrangement. Each of the lighting devices 1144A-1144D has a first mitered end and a second mitered end to form the rectangular arrangement shown in FIG. 11. The lighting device 1144A and the lighting device 1144C are coupled to ceiling tile support member rows 1120E, 1120F, and 1120G, while lighting devices 1144B and 1144 are coupled to ceiling tile support member rows 1100B, 1100C, and 1100D.

Referring to FIG. 11, a seventh group of lighting devices 1146A-1146D are coupled to the ceiling tile grid 1110 in an on the grid rectangular arrangement. The seventh group of lighting devices 1146A-1146D is the same as, or similar to, the sixth group of lighting devices 1144A-1144D described above except that each of the lighting devices 1146A-1146D are coupled to only one of the ceiling tile support member rows (in this example, rows 1100B, 1100D, 1120E, and 1120G).

Referring to FIG. 11, an eight group of lighting devices 1148A-1148F are coupled to the ceiling tile grid 1110 in an off the grid rectangular arrangement. The eighth group is similar to the sixth group of lighting devices 1144A-1144D described above except that lighting devices 1148A, 1148B, 1148CD, and 1148E each have only one mitered end, while lighting devices 1148C and 1146F each have two mitered ends.

Referring to FIG. 12, one or more lighting devices (e.g., which can be grouped together to form a plurality of lighting systems) are coupled to a ceiling tile grid 1200, according to some implementations of the present disclosure. The ceiling tile grid 1200 is similar to the ceiling tile grid 1100 (FIG. 11), but differs in that ceiling tile support member rows 1210A-1210D and 1220A-1220B are arranged in a 60-degree pattern to support triangular ceiling tiles (e.g., as opposed to rectangular or square ceiling tiles). In some implementations, a first group of lighting devices 1230A-1230C are coupled to the ceiling tile grid 1220 in an on the grid triangular arrangement, forming a 60-degree triangle. Each of the first group of lighting devices 1230A-1230C has a first mitered end having a first angle and a second mitered end having a second angle, where the first angle is substantially equal to the second angle. In some implementations, a second group of lighting devices 1240A-1240F are coupled to the ceiling tile grid 1220 in an on the grid hexagonal arrangement, forming a 60-degree hexagon. Each of the first group of lighting devices 1240A-1240F has a first mitered end having a first angle and a second mitered end having a second angle, where the first angle is substantially equal to the second angle.

Referring to FIG. 13, one or more lighting devices (e.g., which can be grouped together to form a plurality of lighting systems) are coupled to a ceiling tile grid 1300, according to some implementations of the present disclosure. The ceiling tile grid 1300 is similar to the ceiling tile grid 1100 (FIG. 11), but differs in that ceiling tile support member rows are arranged in a 75-degree pattern to support triangular and parallelogram ceiling tiles (e.g., as opposed to rectangular or square ceiling tiles). In some implementations, a first group of lighting devices 1330A-1330C is coupled to the ceiling tile grid 1300 in an on the grid triangular arrangement, forming a 75-degree triangle. The lighting device 1332A has a first mitered end having a first angle and a second mitered end having a second angle, where the first angle is substantially equal to the second angle. The lighting devices 1332B and 1332C each have a first mitered end having a first angle and a second mitered end having a second angle, where the first angle is different than the second angle. In some implementations, a second group of lighting devices 1332A-1332D are coupled to the ceiling tile grid 1300 in an on the grid parallelogram arrangement, forming a 75-degree right parallelogram. In other implementations, a group of lighting devices that are the same as, or similar to, the second group of lighting devices 1332A-1332D can be coupled to the ceiling tile grid 1300 in an on the grid parallelogram arrangement, forming a 75-degree left parallelogram.

In some implementations, a group of lighting devices that are the same as, or similar to, the second group of lighting devices 1332A-1332D can be coupled to a ceiling tile grid where the ceiling tile support member rows are arranged in a 45-degree pattern. In such implementations, the group of lighting devices can be coupled to the ceiling tile grid and arranged in either a 45-degree left parallelogram arrangement or a 45-degree right parallelogram arrangement.

One or more elements or aspects or steps, or any portion (s) thereof, from one or more of any of claims below can be combined with one or more elements or aspects or steps, or any portion(s) thereof, from one or more of any of the other claims below or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:
1. A lighting device comprising:
   a housing including an internal cavity;
   one or more light sources disposed within the internal cavity of the housing;

a light guide panel disposed within the internal cavity of the housing, the light guide panel being configured to diffuse light emitted by the one or more light sources;

a lens including a base, a first side wall, and a second side wall defining an internal cavity, the lens being coupled to the housing such that (i) at least a portion of the housing is disposed within the internal cavity of the lens and (ii) light diffused by the light guide panel is emitted through the base, the first side wall, and the second side wall of the lens; and one or more rotatable clips coupled to the housing, the one or more rotatable clips being configured to rotate relative to the external structure and mount the lighting device to the external structure.

2. The lighting device of claim 1, wherein each of the one or more rotatable clips includes a base plate, a pair of deflectable arms, and a pair of clasps, the pair of deflectable arms and the pair of clasps being configured to (i) rotate relative to the base plate and (ii) engage the external structure to aid in mounting the lighting device to the external surface.

3. The lighting device of claim 2, wherein the pair of deflectable arms and the pair of clasps of each of the one or more rotatable clips are coupled to the base plate via a rivet.

4. The lighting device of claim 2, wherein the housing further includes a groove extending along a longitudinal axis of the housing, the groove being configured to receive a portion of the rivet of each of the one or more rotatable clips therein.

5. The lighting device of claim 2, wherein the external structure is a ceiling tile support member and the one or more rotatable clips are configured such that a first one of the pair of clasps and a first one of the pair of deflectable arms engage a first side of the ceiling tile support member and a second one of the pair of clasps and a second one of the pair of deflectable arms engage a second side of the ceiling tile support member.

6. The lighting device of claim 1, wherein the one or more rotatable clips includes a plurality of rotatable clips.

7. The lighting device of claim 1, wherein the housing includes a first flange and a second flange extending along the longitudinal axis of the housing, the first flange and second flange being configured to aid in coupling the one or more rotatable clips to the housing.

8. The lighting device of claim 7, further comprising one or more fasteners configured to aid in coupling the one or more rotatable clips to the housing and to aid in inhibiting linear movement of the one or more rotatable clips relative to the housing.

9. The lighting device of claim 8, wherein the housing includes a first threaded groove and a second threaded groove, wherein the one or more rotatable clips are coupled to the housing via threaded connections between the one or more fasteners and the first threaded groove or the second threaded groove.

10. The lighting device of claim 1, wherein the housing includes a first side wall and a second side wall defining the internal cavity.

11. The lighting device of claim 10, further comprising a first bracket coupled to the first side wall of the housing and a second bracket coupled to the second side wall of the housing, the first bracket and second bracket being configured to aid in coupling the light guide panel to the housing.

12. The lighting device of claim 11, wherein the first bracket is coupled to the first side wall of the housing via a snap fit connection.

13. The lighting device of claim 11, wherein a portion of the first bracket is positioned between the first side wall of the lens and the first side wall of the housing and a portion of the second bracket is positioned between the second side wall of the lens and the second side wall of the housing.

14. The lighting device of claim 13, wherein the first side wall of the lens is coupled to the first bracket via a snap fit connection and the second side wall of the lens is coupled to the second bracket via a snap fit connection.

15. The lighting device of claim 1, further comprising a first end cap coupled to a first end of the housing.

16. The lighting device of claim 15, wherein the housing includes a groove extending along a longitudinal axis of the housing and the first end cap includes a tongue configured to engage the groove to aid in coupling the first end cap to the housing.

17. The lighting device of claim 1, further comprising an alignment plate coupled to an end of the housing, the alignment plate being configured aid in coupling the lighting device to a second lighting device, wherein the housing further includes a first flange and a second flange configured to aid in coupling the alignment plate to the housing.

18. The lighting device of claim 17, wherein the housing further includes a first threaded groove and a second threaded groove, and wherein the alignment plate is coupled to the housing via a first fastener that engages the first threaded groove and a second fastener that engages the second threaded groove.

19. The lighting device of claim 1, wherein each of the one or more light sources includes one or more light emitting diodes (LEDs).

20. The lighting device of claim 1, wherein the one or more lights sources include a first light source positioned adjacent to a first side of the light guide panel and a second light source positioned adjacent to a second opposing side of the light guide panel, wherein the first light source is configured to emit light having a first wavelength and the second light source is configured to emit light having a second wavelength.

* * * * *